No. 746,247.                                                              Patented December 8, 1903.

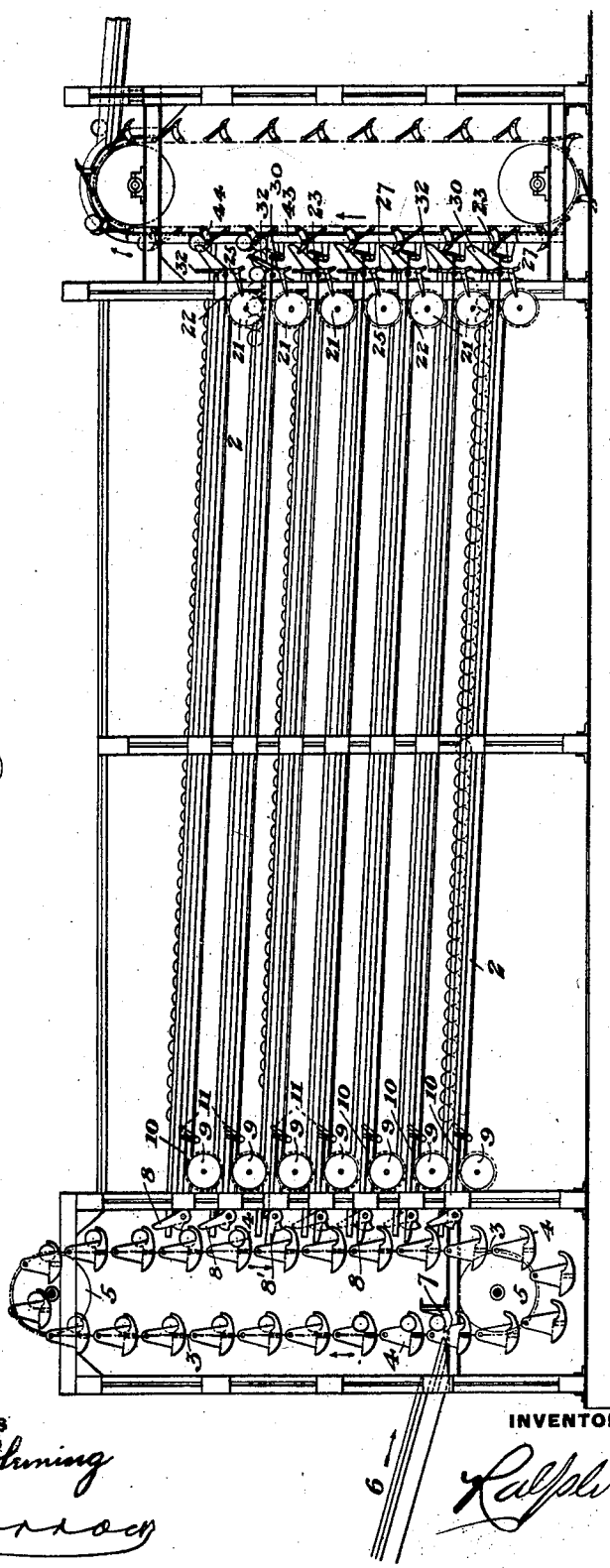

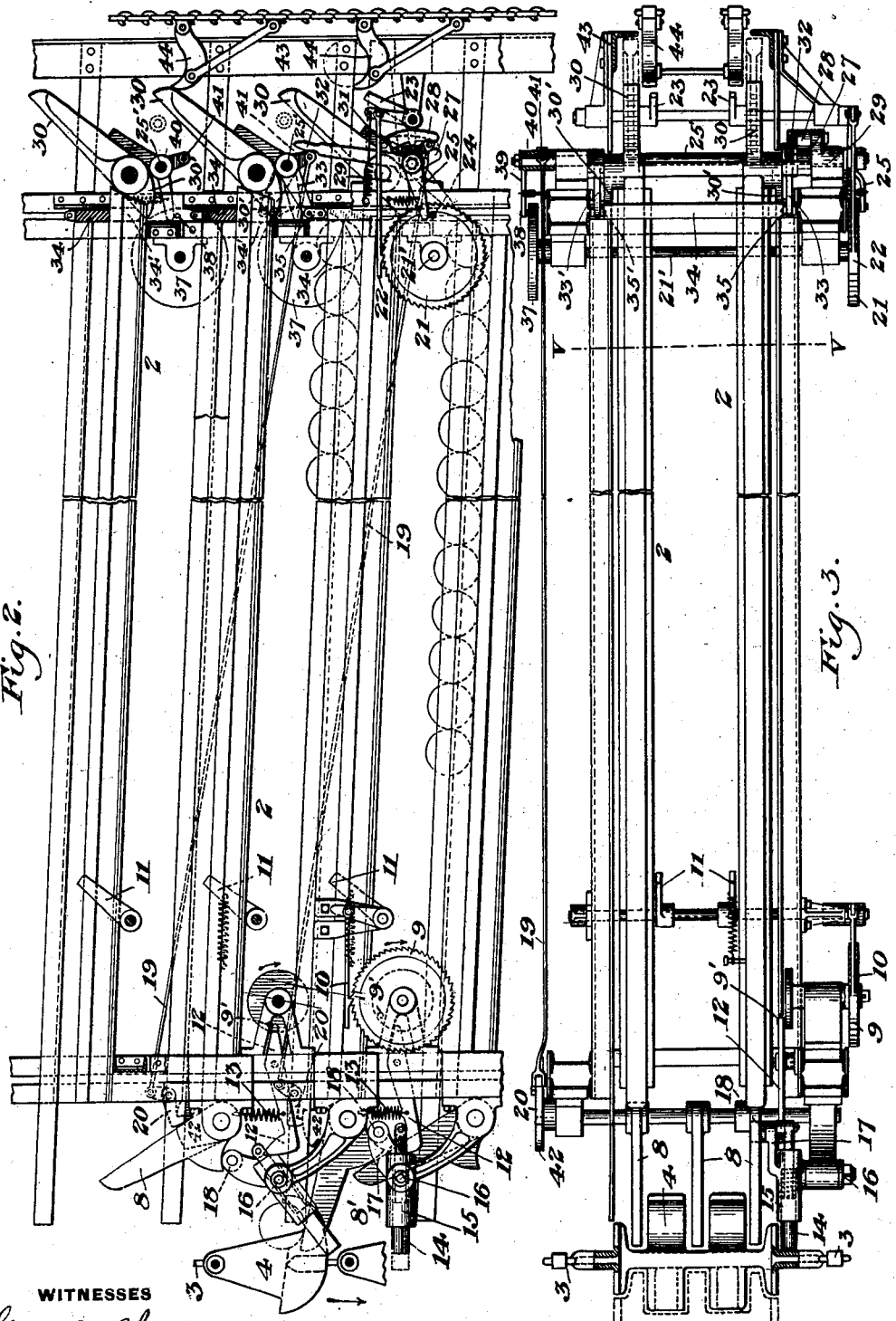

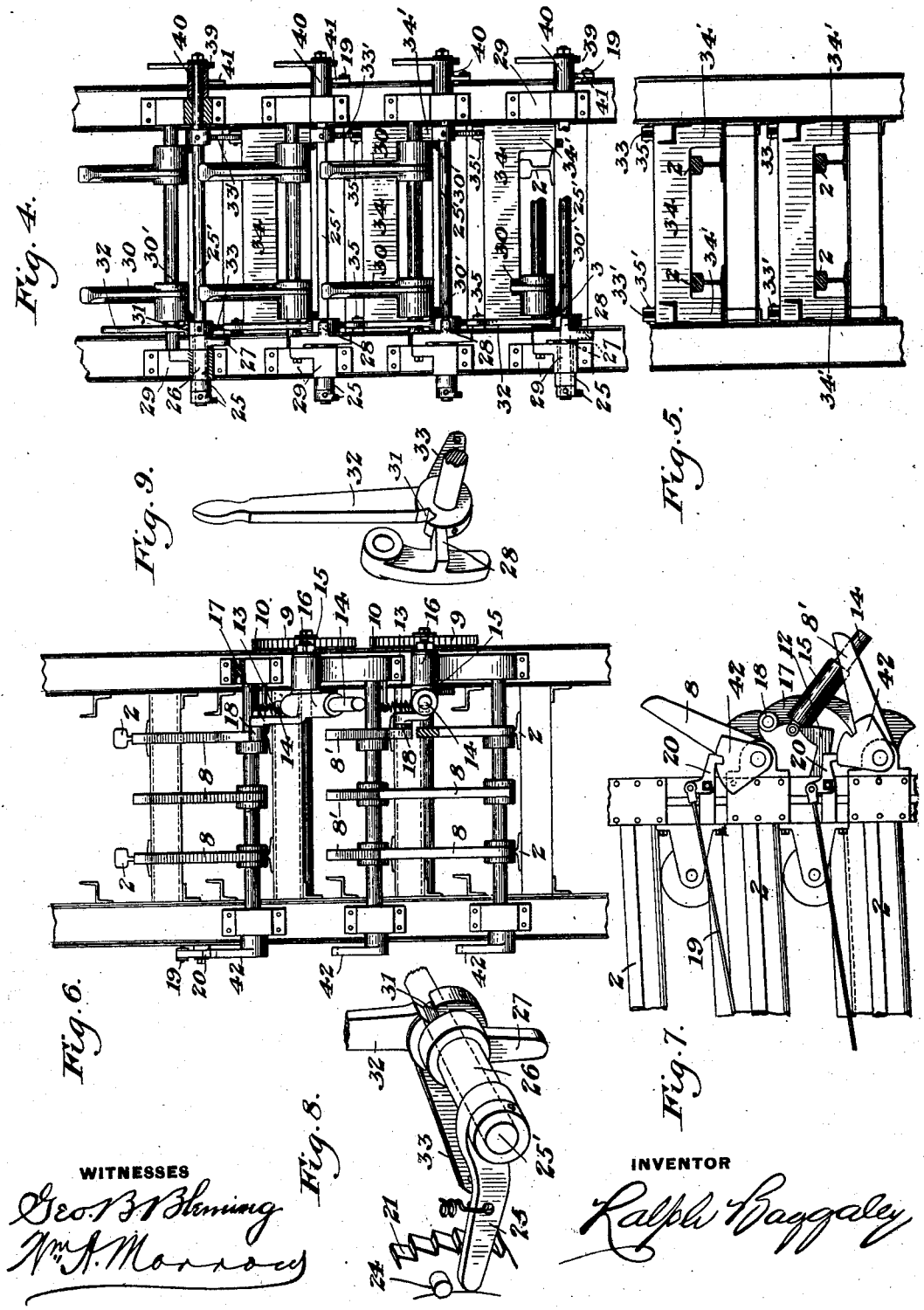

UNITED STATES PATENT OFFICE.

RALPH BAGGALEY, OF PITTSBURG, PENNSYLVANIA.

AUTOMATIC WAREHOUSING-MACHINE.

SPECIFICATION forming part of Letters Patent No. 746,247, dated December 8, 1903.

Application filed March 28, 1903. Serial No. 149,986. (No model.)

*To all whom it may concern:*

Be it known that I, RALPH BAGGALEY, of Pittsburg, Allegheny county, Pennsylvania, have invented a new and useful Automatic Warehousing-Machine, of which the following is a full, clear, and exact description, reference being had to the accompanying drawings, forming part of this specification, in which—
Figure 1 is a side elevation of apparatus constructed in accordance with my invention. Fig. 2 is a side elevation, on a larger scale, showing the receiving and delivering mechanism. Fig. 3 is a horizontal section showing one of the racks. Fig. 4 is an elevation of the delivery end. Fig. 5 is a cross-section on the line V V of Fig. 3, showing the delivery-gates. Fig. 6 is an end elevation of the receiving end of the apparatus. Fig. 7 is a detail side elevation thereof. Figs. 8 and 9 are perspective detail views of parts of the delivery mechanism.

My invention has been designed, primarily, to provide means for storing and delivering pigs of copper; but it is capable of use with merchandise of other kinds. The high price of labor in localities in which copper-smelters are generally situated renders storing and shipping of the copper a very considerable item of the expense, and it is the purpose of my invention to reduce this expense by substituting efficient automatic machinery in place of the manual labor heretofore required.

The apparatus shown in the drawings is designed for use with cylindrical pigs, such as are commonly used for the manufacture of wire, which by reason of their shape are adapted to roll by gravity along the racks on which they are stored.
The apparatus comprises a series of racks 2 2, preferably arranged with their receiving ends in substantially the same plane. Each rack is inclined sufficiently to cause the descent of the cylindrical pigs, and each is preferably constituted of two parallel rails on which the pigs rest and rails or guides by which they are guided in their travel down the rack.

The apparatus is constructed with mechanically-acting storing mechanism and delivery mechanism. The storing mechanism consists of an endless chain 3, carrying swinging cradles 4 and arranged to travel around sprocket-wheels 5 5. The pigs of copper are delivered by a chute 6 upon a stop 7, from which they are picked one by one by the ascending series of cradles and are carried up over the upper sprocket-wheel 5 and thence to the receivers, which cause the pigs to roll from the cradles onto the racks. The preferred form of the receivers is shown in detail in Figs. 2 and 3. They consist of pivoted arms 8, which when in receiving position extend outwardly from the end of the rack into the path of the cradles 4, as shown at 8' in Fig. 2, so that as the cradles descend the pigs will be engaged by the arms 8 and will roll down the rack. Mechanism is employed for automatically withdrawing the arms 8 from receiving position as soon as the rack with which the arms are associated becomes fully charged with pigs. For this purpose I prefer to set below each rack a ratchet-wheel 9, whose pawl 10 is operated by an arm 11, which projects through the rack into the path of the pigs and is moved by each pig as it passes. This ratchet operates a projection 9', which at the end of each complete revolution engages a lever 12 and moves its outer end downwardly against the tension of a spring 13. The outer end of the lever 12 serves as a cam to retract from the path of the cradles 4 a spring-actuated pin 14, sliding longitudinally in a case 15, which is pivoted at 16 and has an arm 17, provided at the end with an antifriction-roller 18. When the lever 12 is tripped by the pin 11', its end will be disengaged from the pin 14, which will then spring forward into the path of the chain 3, as shown by dotted lines in Fig. 2. The chain will then engage the pin 14 and turn it on the pivot 16, thus causing the antifriction-roller 18 to bear against the arm 8 and to raise it into elevated position out of the path of the cradles. It remains in this position until the rack is emptied of pigs, when by an operation described below the delivery of the last pig will move lengthwise a rod 19, which releases a catch 20, by which the arms are held in elevated position. When the catch 20 is released, the weight of the arms 8 will cause them to drop into their extended position, thus elevating the pin 14, and the spring 13 by raising the lever 12 will retract the pin 14 out of the path of the chain and bring the parts into the position shown at 8' in Fig. 2.

The delivery mechanism at the lower end of the racks comprises, preferably, a ratchet-wheel 21, set under each rack, whose pawl 22 is operated by an arm 23, which projects into the path of the pigs as they leave the rack and is moved by each passing pig. The ratchet-wheel 21, like the ratchet-wheel 9, is arranged to be moved one complete revolution by the passage of a sufficient number of pigs to fill the rack, and when it has made a complete revolution a pin 24 thereon engages a spring-retracted arm 25 on a sleeve 26, which has a projecting arm 27, adapted to engage a locking-pawl 28, depending from a bracket 29, secured to the frame of the rack. Arms 30 at the delivery end of the rack are also pivoted in the bracket 29, and when the pin 24 engages the arm 25 this arm is depressed and the end of the arm 27 is moved outwardly. This movement forces the locking-pawl 28 out of engagement with the notch 31 in the hand-lever 32. This lever 32 is also provided with an arm 33, which is secured to a sliding gate 34 by a link connection 35. When the locking-pawl 28 is disengaged from the notch 31, the weight of the gate 34 is sufficient to bring the lever 32 into an upright position, as shown in full lines in Fig. 2, and at the same time the extensions 34' engage the arms 30' of the arms 30 as the gate is lowered. This causes the arms 30 to assume an elevated position, as shown in full lines in Fig. 2. On the opposite end of the shaft 21' which carries the ratchet-wheel 22 is a wheel or arm 37, having a pin 38, which is so located that it acts simultaneously with the pin 24 upon an arm 39, secured to a sleeve 40 upon the opposite end of the shaft which carries the sleeve 26 and the arms 25 and 27. To the sleeve 40 is secured a short arm 41, to which the rod 19 is secured, and as the pin 38 depresses the arm 39 the rod 19 is actuated and the catch 20 is released from the notch in the segment 42, by which the arm 8 is held in its raised position. Upon the shaft 25', to which the lever 32 is secured, an arm 33' is mounted and is connected by a link connection 35' with the gate 34. In order to lower the arms 30 at any desired point in the rack, the operator pulls the lever 32 downwardly until the locking-pawl 28 enters the notch 31 in the lever 32. The shaft 25', to which the lever 32 is rigidly secured, rocks in its bearing 29, and the arms 33 and 33', which are secured to said shaft and to the sliding gate, raise the gate as the lever is depressed and permit the arms 30 to fall by gravity into the position shown in dotted lines in Fig. 2 as the sliding gate is raised. The pigs will then roll forward and over the arms 30, upon which a portion of them will rest, the outermost one being held by a suitable stop formed by the frame 43 in a position to be engaged by the bracket 44 of the elevator at the discharging end of the racks. The pigs are then delivered at a higher level, from which they go to the loading-machine.

Within the scope of my invention as defined in the claims the apparatus may be modified in form and construction, since

What I claim is—

1. Storing apparatus comprising a series of racks down which the article can travel, a conveyer adapted to travel along the receiving ends of the racks, receivers adapted to be projected from the racks into the path of the conveyer, a second conveyer at the delivery end of the racks, and arms adapted to be projected from the delivery end of the racks into the path of the second conveyer; substantially as described.

2. Storing apparatus comprising a series of racks superposed one above the other and having their receiving ends substantially in the same plane, a conveyer adapted to travel along the receiving ends of the racks, and receivers adapted to be projected from the ends of the racks into the path of the conveyer; substantially as described.

3. Storing apparatus comprising a series of inclined racks down which the articles can roll, a conveyer adapted to travel along the receiving ends of the racks, receivers adapted to be projected from the racks into the path of the conveyer, and automatic mechanism adapted to move the same out of the path of the conveyer when a rack has received its complement of articles; substantially as described.

4. Storing apparatus comprising a series of inclined racks down which the articles can roll, a conveyer adapted to travel along the receiving ends of the racks, receivers adapted to be projected from the racks into the path of the conveyer, delivery mechanism for the racks, and means operated by said delivery mechanism and adapted to replace said receivers into the path of the conveyer when a given number of articles have been discharged; substantially as described.

5. Storing apparatus comprising a series of racks, delivery-arms at the ends thereof, and automatic means operated by the passing articles and adapted to move said arms out of delivering position when a proper number of articles have been delivered; substantially as described.

6. Storing apparatus comprising a series of racks, delivery-arms at the ends thereof, and automatic means operated by the passing articles and adapted to move said arms out of delivering position when a proper number of articles have been delivered, said means consisting of a gate and tripping mechanism; substantially as described.

In testimony whereof I have hereunto set my hand.

RALPH BAGGALEY.

Witnesses:
GEO. B. BLEMING,
JOHN MILLER.